United States Patent
Cline et al.

[11] Patent Number: 5,884,317
[45] Date of Patent: Mar. 16, 1999

[54] SERVICE INTERFACE REPOSITORY

[75] Inventors: Owen Richard Cline, Poway; B. Charles Eutsler, Escondido; My Tien Pare; Pamela Morgan Smurlo, both of San Diego, all of Calif.

[73] Assignee: BEA Systems, Inc., San Jose, Calif.

[21] Appl. No.: 915,124

[22] Filed: Aug. 20, 1997

[51] Int. Cl.⁶ .................................................. G06F 17/00
[52] U.S. Cl. .................... 707/103; 395/683; 395/200.31; 707/10
[58] Field of Search ............... 707/1–206; 395/683–705, 395/200.31–200.33

[56] References Cited

U.S. PATENT DOCUMENTS 5,793,965  8/1998  Vanderbilt et al. ................ 395/200.31
5,809,507  9/1998  Cavanaugh .............................. 707/103
5,815,710  9/1998  Martin et al. ............................ 395/683

*Primary Examiner*—Thomas G. Black
*Assistant Examiner*—David Yiuk Jung
*Attorney, Agent, or Firm*—Fliesler, Dubb, Meyer & Lovejoy

[57] ABSTRACT

A method, apparatus, and article of manufacture for generation of tools and applications for a computer network. An access server, executed by a first computer accesses interface definitions stored in a database. A data access library, coupled to the access server and executed by a second computer, provides the interface definitions to be stored in the database by the access server. A server, coupled to the data access library and executed by a third computer, sends requests to maintain and use stored interface definitions in the database.

10 Claims, 2 Drawing Sheets

SERVICE INTERFACE REPOSITORY

CROSS-REFERENCE TO RELATED APPLICATIONS

This application is related to the following applications:

Application Ser. No. 08/915,434, entitled "SERVICE INTERFACE REPOSITORY INTERNATIONALIZATION," filed on same date herewith, by Owen R. Cline et al., pending;

Application Ser. No. 08/914,991, "SERVICE INTERFACE REPOSITORY CODE GENERATION DATA," filed on same date herewith, by Owen R. Cline et al., pending;

Application Ser. No. 08/914,988, entitled "SERVICE INTERFACE REPOSITORY APPLICATION PROGRAMMING MODELS," filed on same date herewith, by Owen R. Cline et al., pending;

Application Ser. No. 08/904,406, entitled "SOFTWARE INTERFACE ADAPTER FOR USE WITH MULTIPLE DEVELOPMENT TOOLS," filed on Jul. 31, 1997, by Jack P. Dundon et al., pending;

Application Ser. No. 08/904,401, entitled "SOFTWARE INTERFACE FOR DYNAMIC MAPPING," filed on Jul. 31, 1997, by Jack P. Dundon et al., pending;

all of which are incorporated by reference herein.

BACKGROUND OF THE INVENTION

1. Field of the Invention

This invention relates in general to computer networks, and in particular to a tool for application development for object based computer networks.

2. Description of Related Art

An important trend in the industry is the development of client/server architectures in distributed computing environments to support transaction processing applications. Currently, distributed computing environments typically comprise interconnected mainframes, minicomputers, servers and workstations. This integration of mainframes, minicomputers, servers and workstations into a distributive computing environment creates the need for tools capable of operating in this environment, especially tools that assist in development of applications for distributed computing environments.

SUMMARY OF THE INVENTION

The present invention discloses a method, apparatus, and article of manufacture for a tool that assists in the development of applications for object based computer networks. An access server, executed by a first computer accesses interface definitions stored in a database. A data access library, coupled to the access server and executed by a second computer, provides the interface definitions to be accessed in the database by the access server. A server, coupled to the data access library and executed by a third computer, sends requests to maintain and use stored interface definitions in the database.

A goal of the present invention is to provide tools to aid in interfacing with computer networks. Yet another goal of the present invention is to provide an improved method of storing information on the networks and the components executed by the nodes. Still another goal of the present invention is to provide a method for customers and third party vendors to create their own tools and utilities.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

Figure 1:
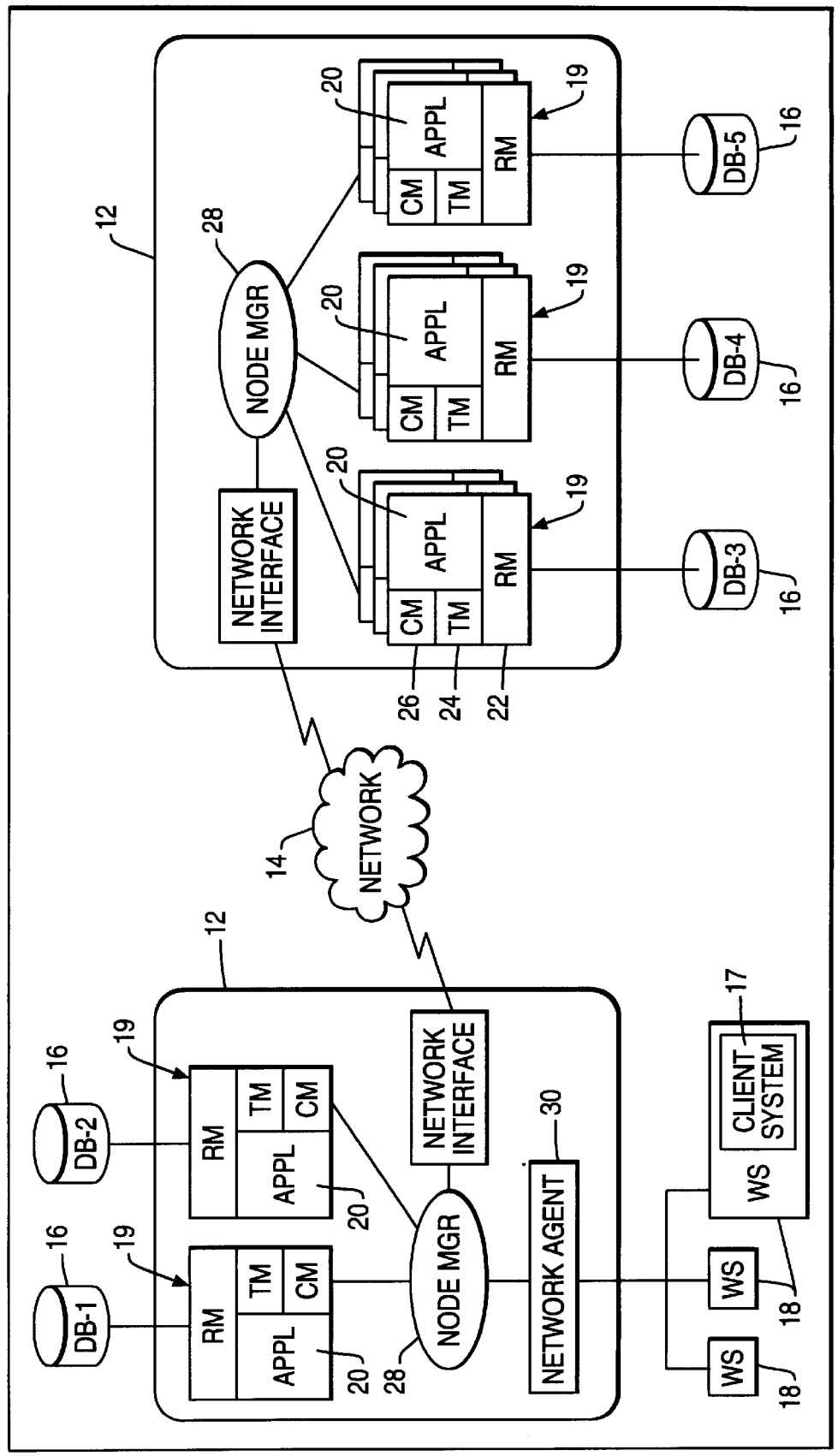
FIG. 1 is an exemplary illustration of a distributed computing environment known as a TOP END™ system.

FIG. 1 is an exemplary illustration of a distributed computing environment 10, known as a TOP END™ system. The present invention comprises a method, apparatus, and program product for facilitating the applications development in such distributed computing environments.

A TOP END™ system 10 is comprised of one or more nodes 12 interconnected by a network 14, wherein each of the nodes 12 is comprised of one or more computers. Each of the nodes 12 is typically coupled to one or more fixed and/or removable data storage units (DSUs) 16, such as disk drives, that store one or more databases.

In the exemplary environment of FIG. 1, a client-server architecture is disclosed. At least one of the nodes 12 provides the connection to client systems 17 operating on workstations 18. The client systems 17 can also be an application component 19 running inside the node 12. Operators of the TOP END™ system 10 use a workstation 18 or terminal to transmit electrical signals to and from server systems operating on the node 12 in the TOP END™ system 10, wherein the electrical signals represent commands for performing various services in the TOP END™ system 10, such as search and retrieval services against the databases. Those skilled in the art will recognize, however, that the present invention has application to any service or software that can be performed by a TOP END™ system 10.

According to the present invention, these services are divided into several modular components 19 that are designed for a distributed, message-passing computing environment. In TOP END™ terminology, a "component" 19 is a process or logical group of processes that performs one or more services. The components 19 work together to process distributed transactions initiated by the client systems 17.

Work is divided among the nodes 12 in the TOP END™ system 10 by spreading the location of these modular components across the nodes 12. Thus, each node 12 performs some localized service and work is managed by the TOP END™ system 10 so that a sequence of multiple services comprising a client system 17 request is performed by one or more of the modular components on one or more of the nodes 12 in the TOP END™ system 10.

The fundamental component in a TOP END™ system 10 is the application component 19. The application component 19 contains application code 20 that links with the libraries to create an application component 19. Application components 19 are used to create and grow distributed TOP END™ systems 10. The application components 19 could be user-written, provided as a solution by an independent vendor, or supplied as part of the TOP END™ system 10. In a TOP END™ system 10, libraries are available to an application component 19, including resource managers 22 such as database management systems (DBMS), transaction managers 24, and communications managers 26.

Another component of a TOP END™ system 10 is the node manager 28. The node manager 28 is a collection of processes that offer core services to coordinate processing among nodes 12. These processes, in general, work independently of each other. Services provided by the node manager 28 include transaction management (for example, commit coordination), logging, failure recovery, client/server request handling, security management, runtime administration, and application component 19 control.

Still another component of a TOP END™ system 10 is the network agent 30. Network agents 30 are used to allow transactions and service requests to enter a TOP END™ system 10 from an application component 19 or networked workstation 18 that does not have a node manager 28 on it.

Service Interface Repository Description

Figure 2:
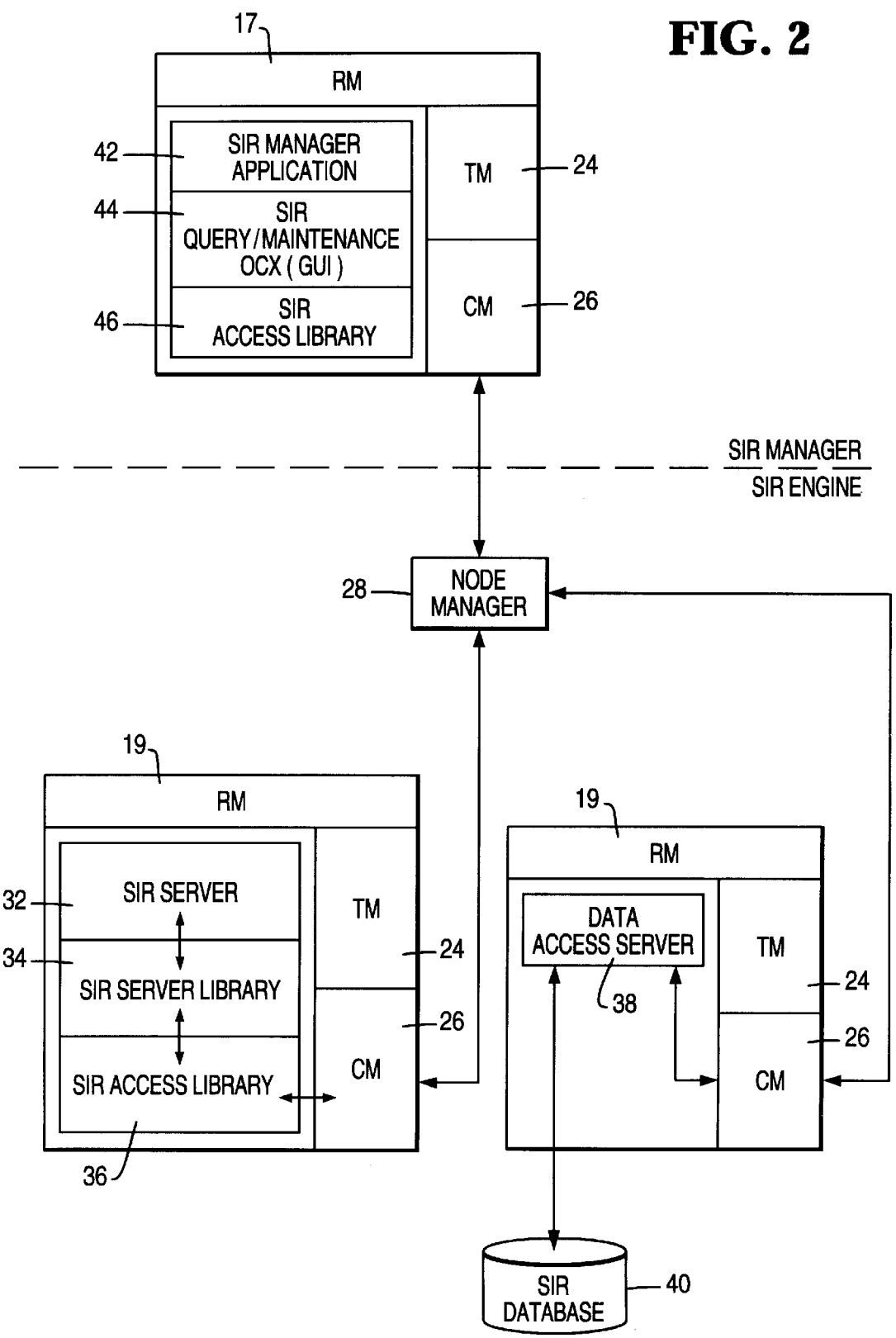
FIG. 2 illustrates the components of the present invention and their relationship to each other.

FIG. 2 illustrates the components of the present invention and their relationship to each other.

The Service Interface Repository (SIR) accelerates development of products, (i.e., combined client systems, application components, and resource managers) that work within the TOP END™ environment. The SIR allows users to store and retrieve the service interface definitions of these products. The definitions can then be used by tools that are integrated with the TOP END™ system 10, via the SIR, for generating code for these products. In addition to supporting code generators, a central repository also means that TOP END™ products and services can be more readily and easily used and reused in new product development. In terms of cost savings, a SIR means that code can be written faster, with fewer rewrites, and can be deployed into the field faster.

The SIR contains features that exceed the most basic information that is needed to generate code for TOP END™ products and services. These additional features include support for aggregate data types (structures, unions and tagged unions), user defined data types, code generation data (default values, validation specifications and Graphical User Interface (GUI) presentation hints), and support for runtime identification of repeating records, tagged unions and output buffers.

Every TOP END™ product is developed to provide one or more services. Each one of these services operates on client system 17 input data and responds to the client system 17 with output data. When requesting a service, a client system 17 needs to know the layout of the input data to send to the application component 19 and the layout of the output data it receives from the application component 19. The current method of developing client systems 17 is manual, such that the interfaces to services, such as the data layouts, are documented by the developer, and read by the client system 17 developer to manually generate client system 17 code. This manual generation of client system 17 code could be automated if the interfaces to services were defined and programmatically accessible.

Further, the simplification and generation features of the present invention can be applied to servers. For example, server definitions are placed into the SIR Database 40 and documentation, template server code, etc. would be generated.

The present invention is a collection of programs that store and retrieve TOP END™ service interface definitions. Definitions of services are stored in the SIR Database 40 either before or after any application using those definitions is written. The SIR can also be used to generate template applications. Since the present invention is not dependent on the actual running TOP END™ system 10, information can be stored in the present invention at any point in the development cycle.

A service interface definition is usually composed of a TOP END™ system 10, with at least one product, one or more services within each product, and the input data and output data for each service.

Input and output data is described using buffers. Multiple buffers indicating multiple protocols within each service are supported.

Buffers are made up of fields and each field has a type. Types can be one of the SIR base types, a user-defined typedef or an aggregate. In addition, code generation data can be specified for each field. Each field is also named such that code generators can use the names for variables and labels.

Further, buffers and aggregates (structures, unions, and tagged unions) can have fields with dynamic and static repetitions. The repetition field represents how many occurrences of the field are within the buffer or aggregate. For static repetitions, any positive non-zero constant integer value can be specified. Dynamic repetitions can either be end-of-buffer or a repeating record count. A repeating record count is a pointer to a preceding field that contains the count of the number of times that the field repeats. Repeating record count fields must precede the field and be of integer or ASCII numeric (precision 0) type. For aggregates, the end-of-buffer capabilities are not available.

As mentioned above, users are able to define their own data types. Users are able to define structures which allow a collection of fields (such as name and address) to be reused in the definitions of multiple services. Typedefs can be defined by tool integrators whose tools support data that can't be represented in terms of the SIR's predefined types. An example of this is the typical "datetime" data type which is supported by all commercial databases but whose internal representation is non-standard. By allowing user-defined typedefs, an "Oracle DateTime" data type can be defined. This data type is different than the "SQL Server DateTime" data type, which also may be defined.

Unions and tagged unions can also be defined. Tagged unions provide assistance to code generation programs because there is a defined variable for runtime identification of the union contents. The type of the tag is specified by the user and can be a 1, 2 or 4 byte binary field, or an ASCII numeric field of a length specified by the user.

Buffers, fields, aggregates and types are reusable objects which can be used in the definition of multiple objects.

The present invention also supports unrestricted categories (or groupings) of objects. Multiple levels of categories can be used to organize system/product/service groupings into a hierarchy. Multiple category paths to the same system/product/service grouping are allowed.

The present invention supports product development in a TOP END™ system 10 as well as third parties who wish to integrate their development tools with the TOP END™ system 10.

For example, a code generator is a type of tool integration. A code generator uses the present invention to display the available products and services and retrieve the definition of the TOP END™ products and services the user selects. The code generator uses the interface definition to generate a client system 17 application for that tool's development environment.

It is envisioned that the present invention can be used by tool vendors who are performing an integration with TOP END™ via the SIR, and by developers who are using the integrated tool (developed by the tool vendor) to create an actual client system 17. The developer can then deploy their client system 17. Further, a customer can integrate the SIR into a custom development environment, or create utilities that generate files that are read in and customized by existing development environments. The simplification and generation features of the present invention can also be applied to servers within the distributed processing system. For example, server definitions are placed into the SIR Database 40 and documentation, template server code, etc. would be generated.

DETAILED DESCRIPTION OF THE SERVICE INTERFACE REPOSITORY

The SIR is a collection of programs and libraries for maintaining and accessing a repository of service interface definitions. These programs and libraries can be broken into two groups: the SIR Manager and the SIR Engine.

As shown in FIG. 2, the SIR Engine is comprised of the SIR Server 32, the SIR Server Library 34, the Data Access Library 36, the Data Access Server 38, and the SIR Database 40.

The SIR Server

The SIR Server 32 is a database independent TOP END™ application component 19. It handles all the maintenance and query requests for objects to the SIR Database 40.

The SIR Server 32 component provides the services for querying and maintaining objects in the SIR Database 40. The SIR Server 32 is a server that can query, add, modify and delete objects in the SIR Database 40. All access to the SIR Database 40 goes through the SIR Server 32.

For each SIR object (system, product, function, category, buffer, field, ADT (typedef and aggregate) and string) there is a get, set, delete, link and unlink service in the SIR Server 32. Objects are created via set services and then linked together using the link services. The get services are used for querying service interface definitions stored in the SIR Database 40. The set, delete, link and unlink services are used for creating and maintaining the service interface definitions stored in SIR Database 40.

The SIR Server 32 does not contain any specialized functionality for any particular data source, e.g., SIR Database 40. Therefore, the SIR Server 32 is fully reusable as a front-end to any data source. All data source specific functionality required by the SIR Server 32 is isolated in the SIR Server Library 34. This means that support for a different data source can be added by creating a new data source specific SIR Server Library 34 and any necessary support between it and the data source.

The SIR Server 32 is a standard TOP END™ server 19. Multiple copies of the SIR Server 32 are supported. The SIR Server 32 also provides support services to report statistics.

The SIR Server 32 buffer and ADT link fields services can be used to create buffer and aggregate definitions which are made up of fields. Buffers and aggregates can have fields with dynamic and static repetitions. Static repetitions can be any positive non-zero integer value. Dynamic repetitions can either be end-of-buffer or a repeating record count. End-of-buffer is indicated by setting the repetitions count to 0. For aggregates, the end-of-buffer capabilities are not available. A repeating record count is a pointer to a preceding field that contains the count of the number of times that the field repeats. Repeating record count fields must precede the field and be of integer or ASCII numeric (precision 0) type. A repeating record count is indicated by setting the repetitions count to the negative value of the count field's internal index.

The SIR Server Library

The SIR Server Library 34 contains all of the logic to translate SIR objects into SIR Database 40 table and row functions. The SIR Server Library 34 is the component which contains information about the actual database schema.

The SIR Server Library 34 is the layer of code which takes object requests from the SIR Server 32 and fulfills them. To do this, the SIR Server Library 34 must adapt to the data source holding the SIR Database 40. The SIR Server Library 34 is the only component which contains information about the actual database schema.

Every data source has a SIR Server Library 34 variant. The SIR Server Library 34 fulfills an object request by making multiple calls for atomic data to the Data Access Server 38 (DAS) via the Data Access Library 36 (DAL). All of these atomic requests for data are grouped as one transaction. Until the SIR Server Library 34 commits the transaction, the DAS 38 does not permanently update the SIR Database 40.

The SIR Data Access Library

The SIR Data Access Library 36 (DAL) is an Applications Programming Interface (API) that provides table and row functions for a specific database (independent of the schema).

The DAL 36 provides a bridge between the SIR Server 32 and the DAS 38. The DAL 36 can be used with any database schema.

The DAL 36 exports functions to performs table and row oriented operations for a given database. The SIR Server Library 34 calls the DAL 36 to interface with the DAS 38. As such, the DAL 36 uses TOP END™ to communicate with the DAS 38.

The Data Access Server

The Data Access Server 38 (DAS) is a TOP END™ application component 19, and provides a service interface to table and row functions for a specific database independent of the schema. For every data source supported, a DAS 38 is created to support all of the table and row oriented functions needed to store and retrieve data in the data source. Depending on the database, multiple instances of the DAS 38 may be supported.

The DAS 38 is compatible with any database schema, not just the one used to represent the SIR Database 40. The DAS 38 also provides support services to report statistics. Each service in the DAS 38 has a matching API in the DAL 46.

The SIR Database

All of the service interface definitions are kept in the SIR Database 40. Further, the SIR Database 40 can be implemented on a commercial database, e.g., users who are running Teradata, Oracle, SQL Server, Informix and Sybase. Commercial database usage is important for enhanced performance and to allow a more seamless integration of the SIR Database 40 with an existing environment.

The SIR Database 40 contains various objects. For each object, textual comments can be added to provide both a short and long description. Table 1 summarizes what the SIR Database 40 contains.

The SIR Manager

The SIR Manager is comprised of the SIR Manager Application 42, the SIR Query/Maintenance Object Linking and Embedding (OLE) Control Library (OCX) 44, and the SIR Access Library 46. The SIR Manager components are typically resident on a client system 17.

The SIR OLE Control Library (OCX)

The OCX 44 is a programmatic interface that provides access to the objects of the SIR via a Graphical User Interface (GUI). The OCX contains logic to maintain (add, update, and delete) and query information in the SIR Database 40. The OCX 44 is typically embedded in OCX 44 container programs and reports the definitions of selected services.

The OCX 44 allows any tool that needs to browse the SIR Database 40, specifically an Object Linking and Embedding (OLE) container, to reuse the SIR Query/Maintenance code. In addition, the OCX 44 has context-sensitive and content level help.

The OCX 44 is also able to print a simple report for a selected object in the tree. The report shows the definitions of a selected object and all of that objects children. If a system is selected, information about the system, the products within that system, the services within each product, the buffers used by each service, the fields that make up each buffer and the type information for each buffer field is printed. For certain types of nodes, parent information is also in the report in order to maintain context, e.g., if a service is selected, the system and product are also printed. If the top-level node is selected, a report for the entire SIR Database 40 is produced. The user also has the ability to save this information to a file.

The OCX 44 displays a hierarchical tree. The tree represents TOP END™ systems 10, products, services (functions performed by the products) and the data sent to and received from each service. Expanding a system displays the products that are members of the system. Expanding a product displays the services that are members of the product. Expanding a service displays the buffers that describe the data sent to and received from the service. Short and long descriptions are available for each system, product, service and buffer. Categories (groupings of systems/products/services) are also displayed in the tree.

Buffers are made up of fields. Each field has a data type. Table 2 lists the predefined data types. The data type can also be user-defined. User-defined types can be either typedef or aggregate. Aggregate data types (structures, unions and tagged unions) are also made up of fields. For each field, additional code generation data can be defined, including the default value, a validation specification and a GUI presentation hint. Because buffers and fields are named, they can be referenced multiple times. For example, a field named lastname can be used in multiple buffers.

Further, buffers and aggregates can have fields with dynamic and static repetitions. A static default value of 1 is typical, but any positive non-zero constant integer value can be specified. Dynamic values are selected from a drop-down list. One of the drop-down list values is end-of-buffer, which results in the field repeating to the end of the buffer. No field can follow a field that repeats to the end of the buffer. Another dynamic selection is a repeating record count, which is the name of a field within the buffer or aggregate that contains a count of the number of times that the field repeats. Fields are added to this list if they precede the field and are an integer or ASCII numeric (precision 0) type.

The OCX 44 provides two modes of use: one for maintaining the contents of the SIR (maintenance mode) and one for querying and extracting information from the SIR (query mode). In maintenance mode all query functionality is available.

Query Mode (OCX)

If the OCX 44 is set in query mode, a read-only tree is available so that users can browse, select services and have interface definitions returned to the containing program. When browsing, users have access to all the object definitions that make up an interface definition. TOP END™ system, product, service, buffer, field, type and category definitions are available. When the user selects a service, the OCX 44 enables methods to transfer the service definition to the containing program.

The OCX 44 also provides a property to assist with restricting the retrieval of service interface definitions to a single system. This is necessary since it is not currently possible to access services from different TOP END™ systems 10 from a single client system 17. Thus, once a service has been selected from a particular system this property can be set and the tree view, and thus interface definition retrieval, are confined to the specified system.

Maintenance Mode (OCX)

If the OCX 44 is set for maintenance mode, it has access to all the query functionality. In addition, the user is able to add, modify and delete objects stored in the SIR Database 40. The user further has the ability to define TOP END™ servers which are comprised of TOP END™ systems 10, products, services and their buffers. The user can also define categories (groupings of systems/products/services).

Buffers are made up of fields. Each field has a type which is either one of the SIR base types a user-defined typedef or an aggregate (also made up of fields). In maintenance mode, users have the ability to create these objects which are in turn used to create buffer definitions.

Programmatic Interface (OCX)

The OCX 44 contains methods and properties that allow the containing program to set the OCX 44 to allow selection only of services that are in a single specified TOP END™ System 10, retrieve the definition of the selected TOP END™ Service, which is then retrieved through multiple method calls that return the definition by tokens, configure filters or groups of filters for certain types of service definition data, where the filters are provided to suppress retrieval of information such as descriptions and code generation data, retrieve error messages, and activate the SIR control for a given mode (Query or Maintenance) which displays the SIR tree. The OCX 44 also has print and save-to-file capabilities, as well as content level help and version information display capabilities.

When the user selects a service, the OCX 44 provides the service definition data through its methods to the containing program. This includes the TOP END™ system 10, product and service names, the function or service qualifier if specified, the definitions of the buffers, all the buffer fields and all the type information for each of the fields that are defined for the selected service.

OCX User Interface

When the OCX 44 is activated, it displays the available TOP END™ systems. From there the user can display the products within a system, the services within a product and the buffers that define a service. There is a visual indication of what type each entry is (system, product, service, or buffer). Buffer indicators represent their types (input, output or input/output).

When a program activates the OCX 44 in query mode, the user is able to navigate through the tree, access descriptions of any object, select a service, and/or enable the OCX 44 to return the definition of the selected service to the containing program.

When a program activates the OCX 44 in maintenance mode, in addition to the query functionality, the user can add, modify and delete objects in the SIR Database 40. The user can add a TOP END™ system 10, add a product to a TOP END™ system 10, add a service and its buffers to a product, create a buffer description made of fields, create a field, create structure, union and tagged union definitions, create user-defined data types, specify default values, validation specifications and presentation hints for fields, obtain a list of items that reference another item, and modify and delete any of the objects in the database. Categories (groupings of systems/products/services) can also.

The SIR Manager Application

The SIR Manager Application 42 contains the OCX 44 and provides graphical query and maintenance access to the SIR. This program also provides print, save-to-file, and content-level and context-sensitive help capabilities.

Although the OCX 44 contains a graphical interface to the SIR, it cannot be used to access the SIR Database 40 until it is contained within a container program and its methods and properties programmed. Therefore a program, the SIR Manager Application, is used to access the SIR Database 40.

The SIR Manager Application 42 also runs in maintenance mode or query mode as described for the OCX 44.

If the SIR Manager Application 42 is running in maintenance mode, the user is able to use the maintenance capabilities of the SIR OCX 44. The user is able to add, modify, and delete the definitions of TOP END™ systems 10, products, services, buffers, fields, default values, validation specifications, presentation hints, structures, unions, tagged unions, user-defined data types and categories. If the program is running in query mode, the maintenance capabilities are not be available.

The SIR Manager Application 44 also has content-level and context-sensitive help and provides printing and save-to-file capabilities.

The SIR Access Library

The SIR Access Library 46 enables the SIR OCX 44 and independent users of the SIR to access objects in the SIR Database 40.

The SIR Access Library 46 exports a set of Application Program Interfaces (APIs) to access the SIR Database 40. APIs are provided to add, update, delete and query objects in the SIR Database 40.

For each SIR object (system, product, function, category, buffer, field, ADT (typedef and aggregate) and string) there is a get, set, delete, link and unlink API in the SAL 46. Objects are created via set APIs and then linked together using the link APIs. The get APIs are used for querying service interface definitions stored in the SIR Database 40. The set, delete, link and unlink APIs are used for creating and maintaining the service interface definitions stored in SIR Database 40.

The SIR Access Library 46 API's are used by a client system 17 to send and receive messages to the SIR Server 32. As such, the SIR Access Library 46 use the TOP END™ system 10 to communicate with the SIR Server 32. Each service in the SIR Server 32 has a matching service in the SIR Access Library (SAL) 46 API. The SAL 46 gives programmers an interface to the SIR Database 40 that does not require specific TOP END™ system 10 service calls.

In order to minimize the number of accesses to the SIR Database 40, the SAL 46 caches information retrieved from and sent to the SIR Server 32.

The SAL 46 buffer and ADT link fields APIs can be used to create buffer and aggregate definitions which are made up of fields. Buffers and aggregates can have fields with dynamic and static repetitions. Static repetitions can be any positive non-zero integer value. Dynamic repetitions can either be end-of-buffer or a repeating record count. End-of-buffer is indicated by setting the repetitions count to 0. For aggregates, the end-of-buffer capabilities are not available. A repeating record count is a pointer to a preceding field that contains the count of the number of times that the field repeats. Repeating record count fields must precede the field and be of integer or ASCII numeric (precision 0) type. A repeating record count is indicated by setting the repetitions count to the negative value of the count field's internal index.

Conclusion

In summary, the present invention discloses a method, apparatus, and article of manufacture for a tool that assists in the development of applications for object-based computer networks. An access server, executed by a first computer accesses interface definitions stored in a database. A data access library, coupled to the access server and executed by a second computer, provides the interface definitions to be stored in the database by the access server. A server, coupled to the data access library and executed by a third computer, sends requests to maintain and use stored interface definitions in the database.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

TABLE 1

| Dababase Objects | Description |
| --- | --- |
| Hierarchical Categories | Any number of category levels can be used to organize system/product/service groupings into a hierarchy. Multiple category paths to the same system/product/service grouping will be allowed. |
| TOP END ™ Systems | One or more TOP END ™ systems can be created from the root node. System names must be unique and adhere to TOP END ™ naming conventions. |
| TOP END ™ Products | One or more TOP END ™ products can be created in a system. Product names must be unique within a system and adhere to TOP END ™ naming conventions. |
| TOP END ™ Service Definitions (TOP END ™ Services) | A server developer can define buffers for a system/product/service grouping. Service names must be unique within a product and adhere to TOP END ™ naming conventions. The TOP END ™ Service is defined to conform to a specified Application Programming Model (APM). The models are:<br>• One Input/One Output Buffer<br>  This model will be used by TOP END ™ Services that have one input buffer and one output buffer. If the user does not define an input buffer, the service takes no input. If the user does not define an output buffer, the service produces no output.<br>• Multiple Input/Multiple Output Buffers (uses tag)<br>  This model is used when the service can accept different input and/or return different output buffers. The client prefixes its buffer with the number which identifies which buffer is being sent. The service prefixes its buffer with the number which identifies which buffer is being returned. (This is not defined as an actual field in the buffer).<br>• Multiple Input/Multiple Output Buffers (uses Format name)<br>  This model is used when the service can accept different input and/or return different output buffers. The client sets the input_format structure with the format name to identify which buffer is being sent. The service sets the output_format structure with the format name to identify which buffer |

TABLE 1-continued

| Dababase Objects | Description |
|---|---|
| | is being returned.<br>• Single Input/Output Buffer<br>This model specifies one buffer for both input and output for the service. The buffer contains fields that are input to the service, output from the service and fields that are both input and output. One field can be identified as being the return value for the service.<br>• Free Form<br>This model allows users to define as many input buffers and output buffers as they want. There is no mechanism for identifying which buffer is being used. This model provides limited support to users of the SIR who are doing code generation since there is no identification of buffers at runtime.<br>The purpose of APMs is to provide an indicator to code generators to uniquely identify the buffers used to communicate with TOP END ™ services. This benefit applies to all APMs with the exception of Free Form. |
| Buffer Descriptions | A server developer can group any number of fields into a buffer description. Buffer descriptions support the ability to handle repeating fields. Repeating fields can be specified at development time or detected at runtime. The number and types of buffers defined for a service are specified by its APM. |
| Field Descriptions | Buffers and aggregates are made up of fields. The type of these fields may be one of the provided basic types or a user defined abstract data type. |
| Abstract Data Types | A server developer can define three types of abstract data types (ADT) to be used to type fields. They are: typedefs, structures and unions (including tagged unions). For both structures and unions, nesting is allowed. Regarding unions, tagged unions give information to code generators that let them identify which information is in the union at runtime. Untagged unions do not contain information that would allow code generators to generate code that automatically determines the contents of the union. |
| Default Value Specifications | A server developer can specify a default value for a field description. Separate tables are used for text and scalar field descriptions. A default value would be used to assign an initial value and/or mandate that a value be entered for a particular field. |
| Presentation Hints | A server developer can specify a presentation hint for a field description. These will be used by a code generation program when building the forms to use in a GUI application. They could specify that a Boolean value should be shown as a radio button instead of a checkbox. Other available controls are: single-line edit boxes, single-line text boxes, multi-line edit boxes, multi-line text boxes, list boxes, editable drop-down lists and noneditable drop-down lists. In addition, there is a value that says the field should not be displayed (but its value stored where it can be used or set) and a value that says the field should be ignored. |
| Validation Specifications | A server developer can specify a validation specification for a field description. A validation specification would be used to restrict the values allowed in a particular field description. For example, an integer field could only range from 50 to 100. Separate tables are used for text and scalar fields. The validation specification for text fields contain strings that describe valid values for the field. The validation specification for scalar fields contain a list of ranges of numbers that are valid for the field. |

TABLE 2

| Type | Description |
|---|---|
| SIR_CHAR_T | Single-byte character data |
| SIR_WCHAR_T | Multi-byte character data (2 bytes) |
| SIR_INT8_T | One-byte signed integer |
| SIR_UINT8_T | One-byte unsigned integer |
| SIR_INT16_T | Two-byte signed integer |
| SIR_UINT16_T | Two-byte unsigned integer |
| SIR_INT32_T | Four-byte signed integer |
| SIR_UINT32_T | Four-byte unsigned integer |
| SIR_INT64_T | Eight-byte signed integer |
| SIR_UINT64_T | Eight-byte unsigned integer |
| SIR_FLOAT_T | Four bytes, internal format is application specific |
| SIR_DOUBLE_T | Eight bytes, internal format is application specific |
| SIR_ASCII_NUMERIC_T | Numeric information that has been converted to an ASCII string |
| SIR_BYTE_T | Byte array (1 to n bytes) |

What is claimed is:

1. A programming tool for a distributed processing system, comprising:

an access server, executed by a first computer, for accessing interface definitions stored in a database;

a data access library, coupled to the access server and executed by a second computer, for providing the interface definitions to be accessed in the database by the access server; and a server, coupled to the data access library and executed by a third computer, for sending requests to the database through the access server, wherein the requests maintain and use the interface definitions.

2. The programming tool of claim 1, wherein the programming tool further comprises:

an access library, executed by a fourth computer, for accessing the server and passing query and maintenance requests to the server; and a control, executed by a fifth computer, for interfacing with the access library.

3. The programming tool of claim 2, further comprising a graphical interface program, executed by a sixth computer, for graphically displaying the query and maintenance requests and query and maintenance results on a display of the computer.

4. The programming tool of claim 1, wherein the requests are query requests.

5. The programming tool of claim 1, wherein the requests are maintenance requests.

6. The programming tool of claim 1, wherein the interface definitions are selected from a group comprising systems, products, services, buffer descriptions, field descriptions, abstract data types, dynamic repetitions, static repetitions, and categories.

7. The programming tool of claim 1, wherein the first computer, the second computer, and the third computer are the same computer.

8. The programming tool of claim 2, wherein the fourth computer and the fifth computer are the same computer.

9. The programming tool of claim 3, wherein the fourth computer, the fifth computer, and the sixth computer are the same computer.

10. The programming tool of claim 3, wherein the first computer, the second computer, the third computer, the fourth computer, the fifth computer, and the sixth computer are the same computer.

* * * * *